(12) United States Patent
Baldwin et al.

(10) Patent No.: US 11,213,158 B2
(45) Date of Patent: Jan. 4, 2022

(54) COOKING SYSTEM

(71) Applicant: Breville USA, Inc., Torrance, CA (US)

(72) Inventors: Douglas Baldwin, Arvada, CO (US);
Kevin Klonoff, Kent, WA (US);
Christopher Charles Young, Seattle, WA (US)

(73) Assignee: Breville USA, Inc., Torrance, CA (US)

( * ) Notice: Subject to any disclaimer, the term of this patent is extended or adjusted under 35 U.S.C. 154(b) by 157 days.

(21) Appl. No.: 16/116,460

(22) Filed: Aug. 29, 2018

(65) Prior Publication Data
US 2020/0069103 A1    Mar. 5, 2020

(51) Int. Cl.
*A47J 27/10* (2006.01)
*A23L 5/10* (2016.01)
*A47J 36/32* (2006.01)

(52) U.S. Cl.
CPC ............... *A47J 27/10* (2013.01); *A23L 5/13* (2016.08); *A47J 36/321* (2018.08); *A23V 2002/00* (2013.01)

(58) Field of Classification Search
CPC ............... A47J 27/10; A47J 36/321; A47J 43/04; A47J 27/00; A47J 36/2405; A47J 27/004;
(Continued)

(56) References Cited

U.S. PATENT DOCUMENTS 4,309,584 A    1/1982 Terakami et al.
4,390,766 A    6/1983 Horinouchi et al.
(Continued)

FOREIGN PATENT DOCUMENTS

CN    104898613 A    9/2015
EP    1406184 A1    4/2004
(Continued)

OTHER PUBLICATIONS

Class lectures for Electrical Engineering 363, "The Kalman filter" Stanford University published 2008-2009 (Year: 2008).*

(Continued)

*Primary Examiner* — Phuong T Nguyen
*Assistant Examiner* — Yeong Juen Thong
(74) *Attorney, Agent, or Firm* — Seed Intellectual Property Law Group LLP

(57) ABSTRACT

Predictive cooking systems and methods. A representative system can include a cooking device submergible in a container of fluid and a memory device storing instructions for causing a processor to receive information and determine heater set point temperature and on time. The processor can receive information indicative of one or more characteristics of a food item to be cooked in the fluid and a desired food temperature. The processor can perform a control process that can include sending instructions for controlling a heater, obtaining a temperature measurement of the fluid from a temperature sensor, determining a measurement of power delivered to the heater, determining constants related to corresponding physical characteristics of the fluid and/or the container based on at least one of the temperature measurement and the measurement of power, and determining a food temperature of the food item.

20 Claims, 11 Drawing Sheets

(58) Field of Classification Search
CPC .... A47J 37/0786; A47J 37/0754; A47J 37/07;
A47J 37/0611; A47J 37/0676; A23L 5/13;
A23V 2002/00; G08B 21/18; B25J 9/00;
B25J 9/0081; F24C 15/105; H05B 1/029;
H05B 3/44; H05B 1/0266
USPC .................. 99/330, 325, 342; 219/702, 710
See application file for complete search history.

(56) References Cited

U.S. PATENT DOCUMENTS

| | | | |
|---|---|---|---|
| 4,807,169 A | 2/1989 | Overbeck | |
| 5,096,725 A | 3/1992 | Kim et al. | |
| 5,183,984 A | 2/1993 | Nakagawa et al. | |
| 5,352,874 A | 10/1994 | Gong et al. | |
| 5,750,960 A | 5/1998 | Bresolin et al. | |
| 5,877,477 A | 3/1999 | Petty et al. | |
| 6,486,453 B1 | 11/2002 | Bales et al. | |
| 6,539,842 B1 | 4/2003 | Chapman et al. | |
| 6,568,848 B1 | 5/2003 | Chapman et al. | |
| 6,712,505 B2 | 3/2004 | Chapman et al. | |
| 6,759,637 B2 | 7/2004 | Kim et al. | |
| 6,789,067 B1 | 9/2004 | Liebenow | |
| 6,811,308 B2 | 11/2004 | Chapman et al. | |
| 6,933,483 B2 | 8/2005 | Chun et al. | |
| 7,102,107 B1 | 9/2006 | Chapman | |
| 7,372,368 B2 | 5/2008 | Chapman et al. | |
| 7,605,349 B2 | 10/2009 | Steinman et al. | |
| 7,685,256 B2 | 3/2010 | Kudo et al. | |
| 7,722,248 B1 | 5/2010 | Chapman et al. | |
| 8,240,914 B1 | 8/2012 | Chapman et al. | |
| 8,323,026 B2 | 12/2012 | Do et al. | |
| 8,342,847 B2 | 1/2013 | Grigsby et al. | |
| 8,419,434 B2 | 4/2013 | Do et al. | |
| 8,455,028 B2 | 6/2013 | Breunig et al. | |
| 10,194,770 B2 | 2/2019 | Young et al. | |
| 2003/0037681 A1 | 2/2003 | Zhu et al. | |
| 2004/0267382 A1 | 12/2004 | Cunningham et al. | |
| 2005/0193901 A1 | 9/2005 | Buehler et al. | |
| 2006/0136078 A1 | 6/2006 | Chen et al. | |
| 2007/0158335 A1 | 7/2007 | Mansbery et al. | |
| 2008/0136785 A1 | 6/2008 | Baudisch et al. | |
| 2008/0140862 A1 | 6/2008 | Elston et al. | |
| 2008/0222553 A1 | 9/2008 | Benjamin-Lambert et al. | |
| 2009/0029326 A1 | 1/2009 | Kark et al. | |
| 2009/0236333 A1* | 9/2009 | Ben-Shmuel | F25D 31/005 219/702 |
| 2009/0236335 A1 | 9/2009 | Ben-Shmuel et al. | |
| 2009/0258331 A1* | 10/2009 | Do | G09B 21/003 434/127 |
| 2010/0147823 A1 | 6/2010 | Anderson et al. | |
| 2010/0292998 A1 | 11/2010 | Bodlaender et al. | |
| 2010/0313768 A1 | 12/2010 | Koether et al. | |
| 2011/0185915 A1* | 8/2011 | Eades | A47J 27/21058 99/331 |
| 2012/0032524 A1 | 2/2012 | Baarman et al. | |
| 2013/0125763 A1 | 5/2013 | Valance | |
| 2013/0294477 A1* | 11/2013 | Rankin | A47J 36/32 374/45 |
| 2013/0306627 A1 | 11/2013 | Libman et al. | |
| 2014/0107178 A1 | 4/2014 | Brown et al. | |
| 2014/0292536 A1 | 10/2014 | Barth et al. | |
| 2014/0295822 A1* | 10/2014 | Koo | A47J 36/321 455/420 |
| 2014/0314921 A1 | 10/2014 | Kuempel et al. | |
| 2015/0194041 A1 | 7/2015 | Allen | |
| 2015/0212661 A1 | 7/2015 | Robberechts et al. | |
| 2015/0257574 A1 | 9/2015 | Hoare | |
| 2015/0290795 A1 | 10/2015 | Oleynik | |
| 2015/0294225 A1 | 10/2015 | Takei | |
| 2015/0312964 A1 | 10/2015 | Sorenson et al. | |
| 2016/0005327 A1 | 1/2016 | Young | |
| 2016/0073451 A1 | 3/2016 | Reischmann et al. | |
| 2016/0092680 A1 | 3/2016 | Hennig et al. | |
| 2016/0100717 A1 | 4/2016 | Zhu | |
| 2016/0174748 A1 | 6/2016 | Baldwin et al. | |
| 2016/0198885 A1* | 7/2016 | Logan | A47J 36/00 99/325 |
| 2016/0220059 A1 | 8/2016 | Wachtler et al. | |
| 2016/0220064 A1 | 8/2016 | Young et al. | |
| 2016/0235239 A1* | 8/2016 | Patadia | A47J 27/0802 |
| 2016/0315784 A1 | 10/2016 | Wu et al. | |
| 2016/0324366 A1 | 11/2016 | Wu et al. | |
| 2017/0007064 A1 | 1/2017 | Chen | |
| 2017/0020324 A1* | 1/2017 | Young | G05B 19/042 |
| 2017/0139385 A1 | 5/2017 | Young et al. | |
| 2017/0150842 A1 | 6/2017 | Young et al. | |
| 2017/0162073 A1 | 6/2017 | Salazar et al. | |
| 2017/0245687 A1* | 8/2017 | Stach | A47J 43/04 |

FOREIGN PATENT DOCUMENTS

| | | | |
|---|---|---|---|
| EP | 2292981 A2 | 3/2011 | |
| EP | 2767159 B1 | 11/2015 | |
| JP | H0644510 B2 * | 6/1994 | |
| JP | 2002063178 A | 2/2002 | |
| JP | 2003050907 A | 2/2003 | |
| JP | 3602400 B2 | 12/2004 | |
| JP | 4288208 B2 | 7/2009 | |
| KR | 10-1990-0012053 A | 8/1990 | |
| KR | 20080089947 A | 10/2008 | |
| KR | 10-2011-0080988 A | 7/2011 | |
| KR | 20120029027 A | 3/2012 | |
| KR | 10-2014-0051153 | 4/2014 | |
| KR | 10-2014-0103798 A | 8/2014 | |
| WO | 2007051049 A2 | 5/2007 | |
| WO | 2012092641 A1 | 7/2012 | |
| WO | 2015075730 A2 | 5/2015 | |
| WO | 2016/077360 A1 | 5/2016 | |
| WO | 2017015270 A1 | 1/2017 | |
| WO | 2017/059328 A1 | 4/2017 | |

OTHER PUBLICATIONS

Baldwin, Douglas. "DouglasBaldwin.com expert in sous vide cooking and nonlinear waves," <http://douglasbaldwin.com/sous-vide.html>, 2008, 40 pages.

European Patent Office, Communication pursuant to Article 94(3) EPC, EP Patent Application 15818874.8, dated Jun. 5, 2018, 10 pages.

International Search Report and Written Opinion of the International Searching Authority, dated May 12, 2016, for International Application No. PCT/US2016/015388, 9 pages.

International Search Report and Written Opinion, dated Jan. 25, 2017, for International Application No. PCT/US2016/057205, 16 pages.

International Search Report and Written Opinion, dated Jan. 31, 2017, for International Application No. PCT/US2016/061886, 9 pages.

International Search Report and Written Opinion, dated Oct. 27, 2016, for International Application No. PCT/US2016/042924, 17 pages.

International Search Report dated Sep. 23, 2015 for International Application No. PCT/US2015/038858, 3 pages.

International Search Report, dated Apr. 6, 2016, for corresponding International Application No. PCT/US2015/066697, 6 pages.

Kasper, Lynne Rosette. "There's more than one way to cook an egg. Dave Arnold has 11," https://web.archive.org/web/20130416002008/https://www.splendidtable.org/story/theres-more-than-one-way-to-cook-an-egg-dave-arnold-has-11 on Sep. 5, 2018; Wayback Mach, 4 p.

Written Opinion dated Sep. 23, 2015 for International Application No. PCT/US2015/038858, 11 pages.

Written Opinion of the International Searching Authority, dated Apr. 6, 2016, for corresponding International Application No. PCT/US2015/066697, 11 pages.

European Patent Office, Extended European Search Report, EP Patent Application 16866918.2, dated Feb. 28, 2019, 10 pages.

(56) References Cited

OTHER PUBLICATIONS

International Search Report and Written Opinion dated Nov. 19, 2019 for International Application No. PCT/US2019/048757, 10 pages.
U.S. Appl. No. 14/789,414, filed Jul. 1, 2015; titled Systems, Articles and Methods Related to Providing Customized Cooking Instruction.
U.S. Appl. No. 15/432,790, filed Feb. 14, 2017; titled Systems, Articles and Methods Related to Providing Customized Cooking Instruction.
U.S. Appl. No. 14/974,635, filed Dec. 18, 2015; titled Food Preparation Guidance System.
U.S. Appl. No. 15/009,525, filed Jan. 28, 2016; titled Food Preparation Control System.
U.S. Appl. No. 15/214,056, filed Jul. 19, 2016; titled Food Preparation Control System.
U.S. Appl. No. 15/432,792, filed Feb. 14, 2017; titled Food Preparation Control System.
U.S. Appl. No. 15/351,091, filed Nov. 14, 2016; titled Data Aggregation and Personalization for Remotely Controlled Cooking Devices.

* cited by examiner

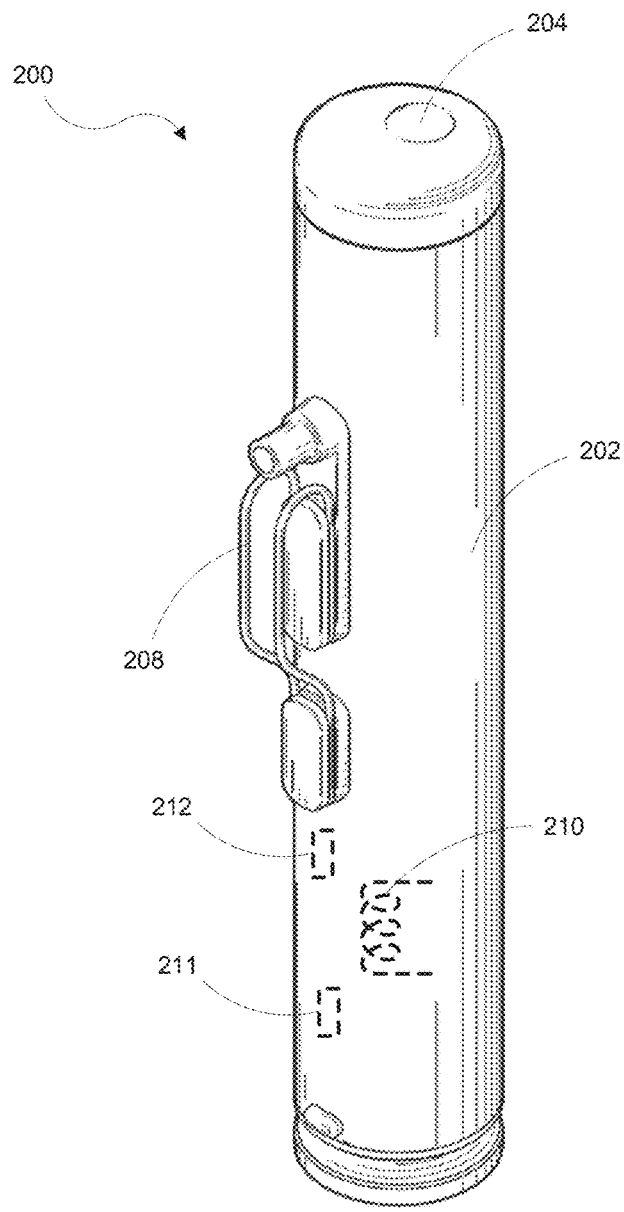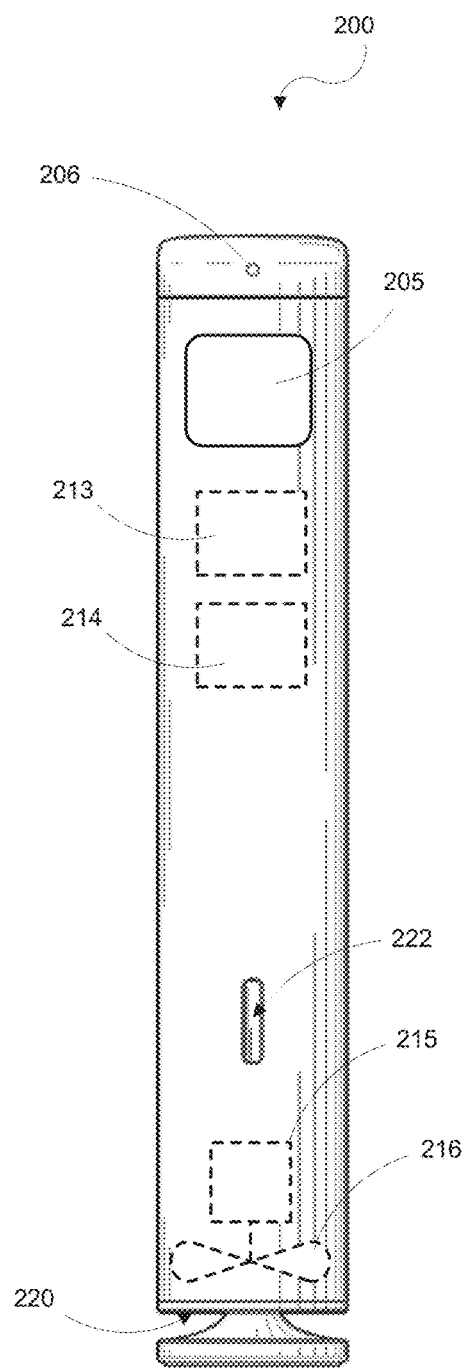
FIG. 2A
FIG. 2B

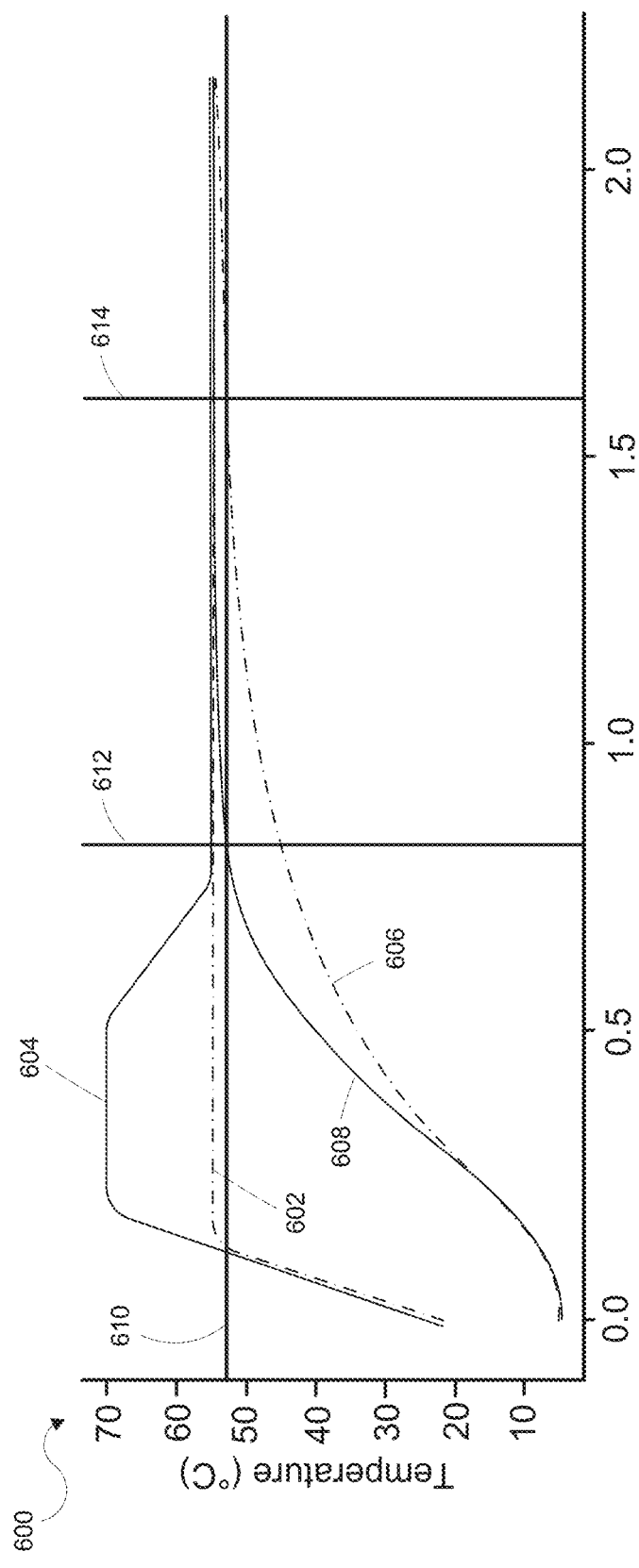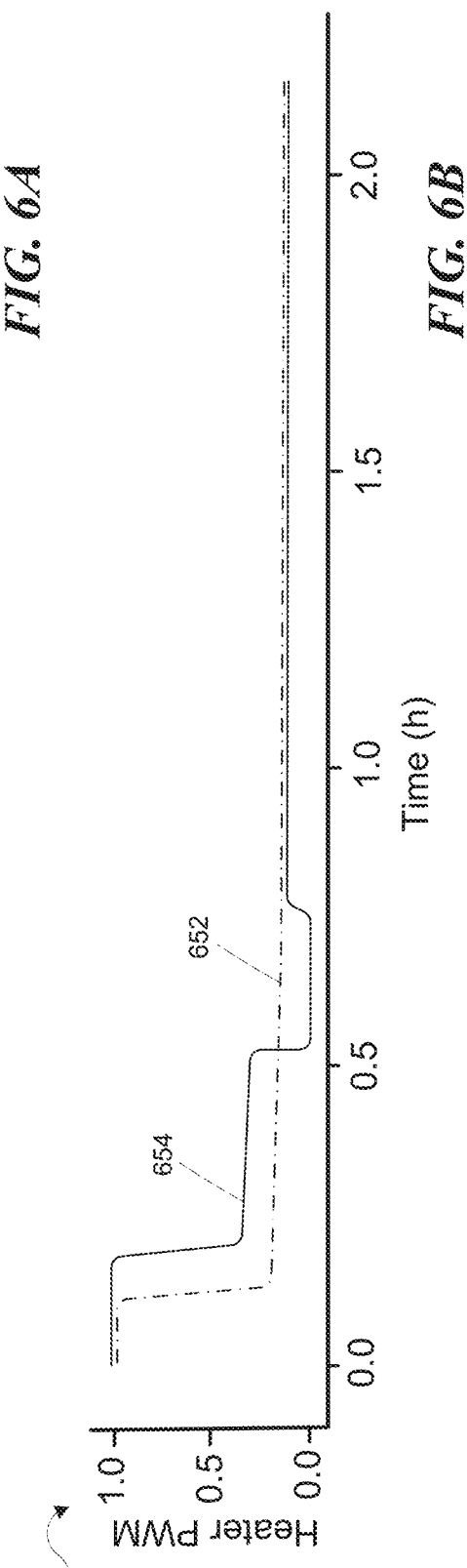

COOKING SYSTEM

TECHNICAL FIELD

This present technology is directed to food preparation and, more specifically, to sous vide cooking systems and methods.

BACKGROUND

Sous vide cooking is a method of cooking where the food is sealed in a plastic bag and then placed in a hot water bath until the food reaches the desired internal temperature. The hot water bath temperature is typically much lower than used for cooking in an oven or on a stove. Although sous vide cooking does typically take longer than traditional methods, the result is moist food that is evenly cooked, ensuring that the inside is properly cooked without overcooking the outside.

With traditional cooking methods, heat flows from a burner to a pan then into the food, or the elements of an oven heat the air around the food. Because the air in the oven and the metal in the pan are much hotter than the desired internal temperature of the food, the food cooks more on the outside and the food must be removed from the heat at just the right time. These traditional cooking methods have a narrow window of time in which the food is properly heated. If the food is removed from the heat too early or too late, the food will be either over- or undercooked. But when cooking with water, instead of an oven or a pan, the water temperature can be set just high enough to get the food to the preferred temperature without having to remove it from the heat at exactly the right time. Therefore, there is a much wider window of time in which the food is at the desired temperature.

BRIEF DESCRIPTION OF THE DRAWINGS

Embodiments of representative predictive cooking systems and methods described herein may be better understood by referring to the following Detailed Description in conjunction with the accompanying drawings, in which like reference numerals indicate identical or functionally similar elements:

FIG. 2A is an isometric view of a representative cooking device;

FIG. 2B is a front view in elevation of the cooking device shown in FIG. 2A;

FIG. 6A is a graph showing temperatures over time for a fluid bath and a core temperature of a food item during traditional and predictive cooking processes;

FIG. 6B is a graph showing power input over time to a heater corresponding to the cooking temperatures shown in FIG. 6A;

Figure 1:
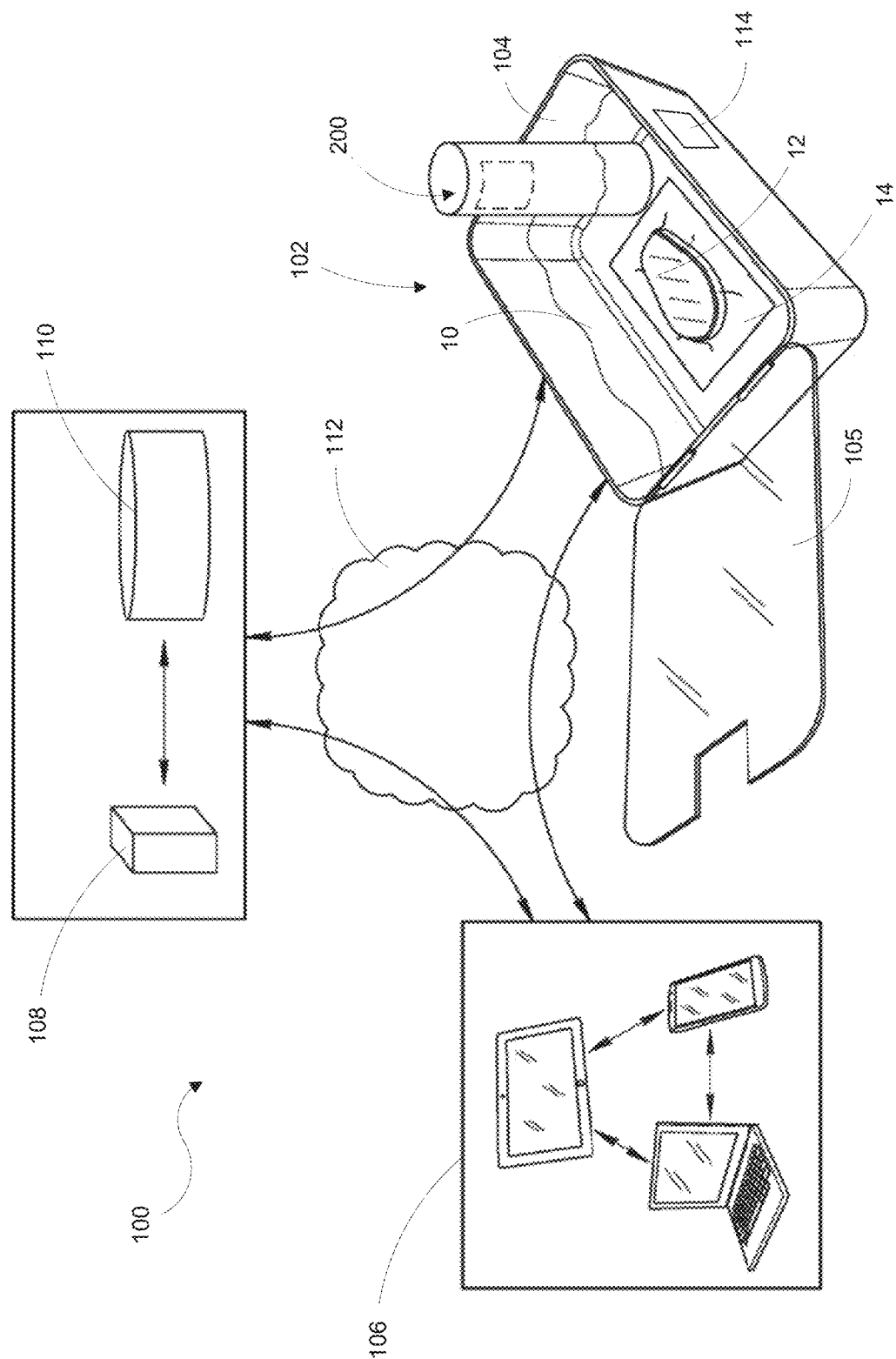
FIG. 1 illustrates a schematic view of a predictive cooking system according to some embodiments of the present technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and/or alternatives of the technology falling within the scope of this disclosure.

DETAILED DESCRIPTION

Overview

Methods and systems for predictive cooking are disclosed. The disclosed technology can be used to estimate various unknown constants related to a cooking environment. For example, in a sous vide cooking environment, container size and shape, fluid mass and volume, thermal conductivity of the container, evaporation losses, and food item characteristics are examples of potentially unknown variables.

In some implementations, these constants are determined by solving a physical model based on changes in measured fluid temperature and known power delivered to the fluid via a heater. Data on how the temperature of the fluid responds over time to a known power input can be used to estimate the constants in the physical model. The physical model can then be used to predict the fluid temperature in the future by iterating the model forward in time. Accordingly, the core temperature of the food item being cooked and the temperature gradient from the surface of the food item to its core can be predicted. From these predictions the heater set point temperature and heater power-on time can be optimized to cook the food item as fast as possible or to be done at a selected time of day without exceeding an acceptable temperature gradient.

In traditional sous vide cooking the water rises to a set point corresponding to the desired final temperature of the food item and is held there until the food reaches that temperature resulting in very little if any temperature gradient across the food. By accepting a small temperature gradient within the food, the fact that hotter water heats food faster than cooler water can be used to significantly reduce the heating time of sous vide cooking. The disclosed predictive cooking systems can temporarily heat the water above the traditional sous vide set point and then allow it to naturally cool back to the desired final temperature.

General Description

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below to avoid unnecessarily obscuring the relevant description.

FIG. 1 illustrates a schematic view of a predictive cooking system 100 according to a representative implementation. The predictive cooking system 100 can include a cooking appliance 102, one or more processors 108, and one or more memory devices 110 communicatively coupled together via one or more communication channels, such as communication networks 112. A client computing device 106 can communicate with the system 100 via the communications networks 112 to provide input to the system. For example, a user can use the client computing device 106 to provide a desired food temperature, an acceptable temperature gradient across the food item, food item characteristics (e.g., type, weight, thickness, shape) and container characteristics (e.g., size, shape, volume).

The cooking appliance 102 can include a container 104 filled with a fluid 10, such as water, and a cooking device 200, such as a thermal immersion circulator or sous vide device, at least partially submerged in the fluid 10. In some implementations, the cooking appliance 102 can include an information label 114 and a lid 105 configured to cover the container 104 in order to help control heat loss and evaporation of the liquid 10. In the illustrated example, a food item 12, such as a steak, can be placed in a resealable plastic bag 14 and placed in the liquid 10. As the cooking device 200 heats the liquid 10, the food item 12 can be cooked according to the predictive cooking methods disclosed herein. In other implementations, the cooking appliance can comprise an oven or pressure cooker, for example.

As shown in FIG. 2A, the cooking device 200 can include a housing 202 and a mounting clip 208 adapted to attach the cooking device 200 to the container 104 (FIG. 1). The housing 202 can contain a heater 210 and sensors, such as a temperature sensor 211 and a pressure sensor 212. With further reference to FIG. 2B, the housing 202 can contain a motor 215 operatively coupled to an impeller 216 for circulating liquid 10 through inlet 220, across heater 210, and out a discharge outlet 222. The cooking device 200 can include a processor 213 and a memory device 214 (which may be monolithically integrated with the processor). The cooking device 200 can also include a control button 204 (e.g., on/off), an indicator light 206, and/or a user interface 205.

Figure 3:
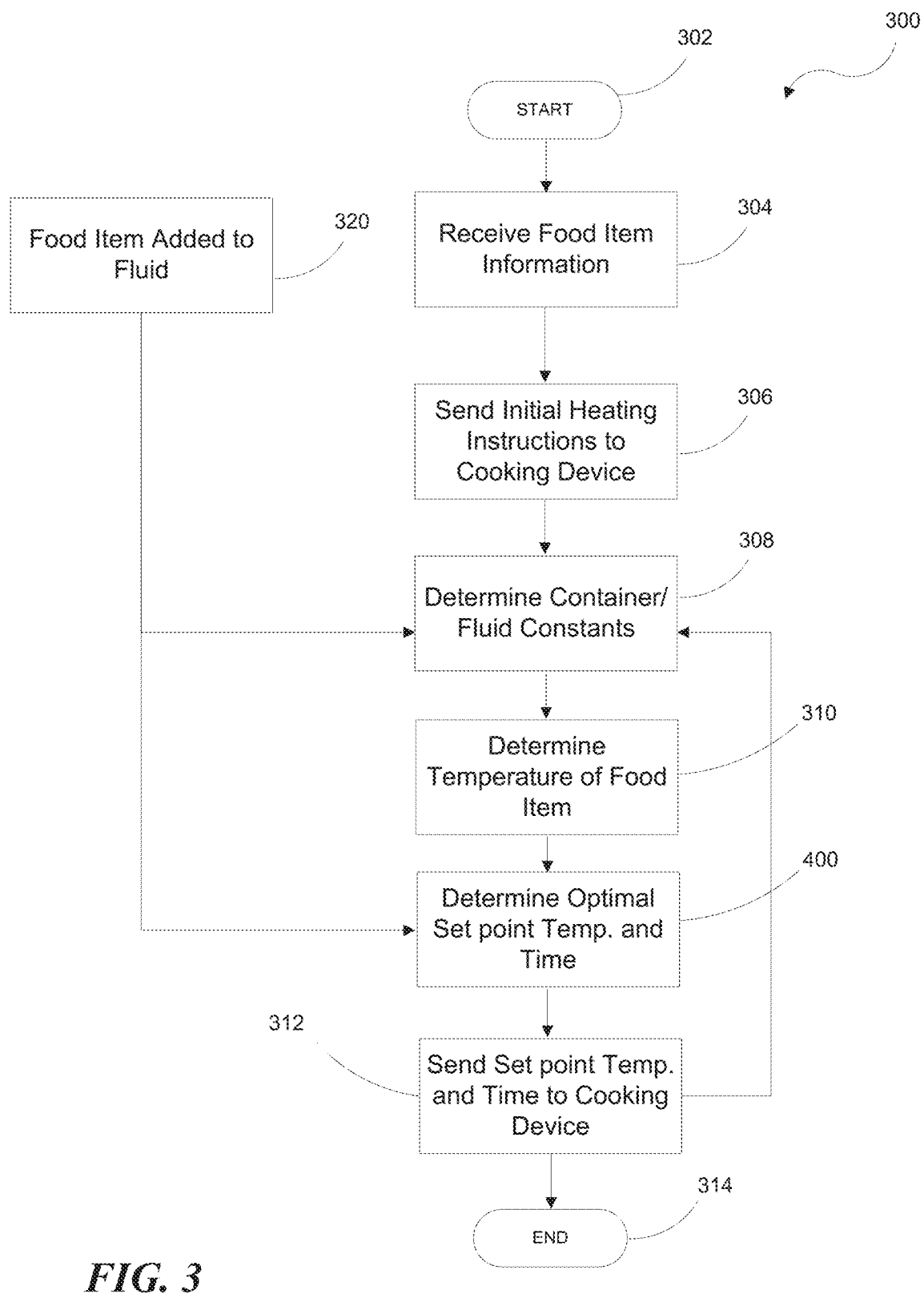
FIG. 3 is a flow diagram showing a method of operation of a processor-based predictive cooking system according to some implementations of the present technology.

FIG. 3 is a flow diagram showing a method of operation 300 of a processor-based predictive cooking system according to some embodiments of the present technology. The method 300 starts at 302. For example, the method 300 can start in response to activation of a specific application on a client computing device 106 (FIG. 1) or via the control button 204 and/or user interface 205 of the cooking device 200 (FIGS. 2A and 2B).

At 304, the system receives information indicative of one or more characteristics of the food item 12. For example, in the case of meat (e.g., steak 12), the system can receive information related to species, cut, thickness, shape, weight, quantity, and the like. Although the systems and methods are described herein with respect to preparing a meat food item, other types of foods can be prepared using the disclosed technology, such as fish, vegetables, puddings, and custards, to name a few.

At 306, the system sends initial heating instructions to the cooking device 200 in order to start heating the fluid 10 (FIG. 1) and obtaining measurements via the temperature and pressure sensors 211/212 (FIGS. 2A and 2B), for example. In some implementations, the system can receive geographic location (e.g., GPS) information from the user device to estimate the atmospheric pressure based on an altitude of the geographic location rather than or in addition to the pressure sensor 212 (FIG. 2A). A measurement of power delivered to the heater 210 (FIG. 2A) can also be determined using calculations based on current, voltage, and/or pulse width input to the cooking device. In some implementations, the initial heating instructions can be determined based on past measurements and calculations which can be used as a starting point to estimate the physical characteristics of the fluid 10 and the container 104 (FIG. 1), for example.

At 308, the system can determine one or more constants related to corresponding physical characteristics of the fluid 10 and the container 104 (FIG. 1) based on changes in temperature relative to the power delivered to the heater 210 (FIG. 2). The system can use least-squares, Kalman filter, or other similar mathematical methods for fitting a physical model to the measured data to estimate characteristics such as fluid mass/volume $c_1$, thermal conductivity of the container to the environment $c_2$, evaporation loss to the environment $c_4$, and an offset $c_3$ that depends on air temperature and dew point (referred to collectively as $c_i$). For example, in some implementations, the system can use the following physical model to determine the above constants related to corresponding physical characteristics of the fluid 10 and the container 104 (FIG. 1):

$$\frac{dT}{dt} \approx c_1(P-F) - c_2 T + c_3 - c_4 H(T), \qquad \text{Equation 1}$$

where P (t) is the power delivered to the heater 210 as a function of time (t), F(t) is the energy going into the food item 12 as a function of time (t), T (t) is the fluid's temperature as a function of time (t), H(T(t)) is the specific humidity at the fluid's surface as a function of time (t), the $c_i \geq 0$ may change in time, often it is effectively piece-wise constant. This change in constants over time can be accomplished with a process noise in a sigma-point Kalman filter or with weights in a least-squares fit, for example. Note that $c_1 \propto V_{fluid}-1$.

In some implementations, information related to the fluid 10 and the container 104 can be input by the user (FIG. 1). For example, the user could provide the dimensions of the container 104 (e.g., length, width, and/or height) and/or the container material, such as glass, metal, or insulated material. This information can be used to refine the physical model by replacing some variables with known constants. In some implementations, the characteristics of the container 104 can be known to the system and need only be identified by name, code number, or a bar code located on the container, for example. The user can enter the name or code, or scan a bar code via camera from a label 114 positioned on the container 104 using a client computing device 106. The system can retrieve all necessary data from memory (e.g., memory 110) related to the identified container.

At 310, the system can approximate the temperature of the food item 12 with:

$$\frac{\partial \tau}{\partial t} = \alpha \left( \frac{\partial^2 \tau}{\partial r^2} + \frac{\beta}{r} \frac{\partial \tau}{\partial r} \right),$$ Equation 2

$$\tau(r, t_0) = \tau_0,$$ Equation 3

$$\frac{\partial \tau}{\partial r}(0, t) = 0, \quad \frac{\partial \tau}{\partial r}(R, t) = \frac{h}{k}[T(t) - \tau(R, t)],$$ Equation 4 where $\tau(0 \le r \le R, t \ge t_0)$ is an estimate of the food's temperature, $t_0$ is when the food is added, $\alpha = k/(\rho c_p)$ is thermal diffusivity, k is thermal conductivity, $\rho$ is density, $c_p$ is specific heat, 2R is the characteristic thickness, $0 \le \beta \le 2$ is the characteristic shape, h is surface heat transfer coefficient, and $\tau_0 \approx 5°$ C. is the initial temperature. The constants $\alpha$, k, $\rho$, $c_p$ are selected based on food type and cut. For example, whether the food item is beef or pork and whether it is a flank steak or a tenderloin. From the temperature distribution the system can estimate the change in energy of the food. Given a temperature profile and a $\beta$, the system performs a numerical integration or quadrature to estimate the energy. The characteristic shape $\beta$ describes how heat is transferred from the boundaries of the food item and can vary from 0 to 2. If the food item is viewed relative to three axes (i.e., x, y, and z), values near zero indicate that the heat is coming from +/− x but not y or z, values near 1 indicate that the heat is coming from +/− x and +/− y but not z, and values near 2 indicate that the heat is coming from all directions.

In situations where multiple food items are to be cooked at the same time the system can use the average thickness and total, combined weight of the food items. In some implementations, the system assumes that all the items are approximately uniform. In other cases, if the items are of disparate shapes, the system can adjust the algorithm so it takes longer to heat so as to mitigate under- and overcooking.

In some implementations, the system can receive shape information related to the food item via the client device 106 (FIG. 1). For example, the client device's camera can be used to capture image date (e.g., via available alternate reality toolkits) which can be related to the food item's characteristic shape parameter $\beta$. The $\beta$ parameter characterizes different shapes, namely plane, cylinder, and sphere/cube, with values ranging from 0 to 2, respectively. In some implementations, the system can draw a box around the food item such that the dimensions, e.g., x, y, z, of the box can be used to estimate the food item's characteristic shape parameter $\beta$.

In some implementations, the shape of the food item to be cooked can be matched with an image of a similar food item shape presented in a user application. In some implementations, the system can use deep learning from a database of labeled images for food item detection based on a photo of the food item to be cooked. In some implementations, image data technology can be used for determination of the fat content of a food item by using its average color (e.g., CIELAB color space) derived from a photo of the food item.

At 400, the system can estimate an optimal cooking program (e.g., heater set point temperature and heater on time). An optimal cooking program seeks to heat the core of the food item in the fastest time possible, without exceeding an acceptable temperature gradient across the food item, thereby overcooking an exterior of the food when attempting to heat the core of the food. This can be referred to as an aggressiveness constraint which informs how hot the edges of the food item can get. The optimization process 400 is more fully described below with reference to FIG. 4.

At 312, instructions (e.g., the cooking program) for controlling the heater can be sent to the cooking device, including information related to a heater set point temperature and a heater on time. Once the cooking program is sent to the cooking device the method can return to 308 to periodically (e.g., every 10-30 seconds) update the container/fluid constants, food item temperature, and the resulting optimal cooking program. Due to heat losses from conduction through the container and evaporation from the surface of the fluid, the fluid heats up more slowly over time. Therefore, the system can periodically recalculate the temperature set point and heater on time to account for changes in the cooking environment.

At 314, the method can terminate, for example, when the food item reaches a desired temperature. For example, the desired temperature can be a selected core temperature of the food item corresponding to rare through well-done. In some implementations, the system can receive an indication from a user via the client computing device 106 (FIG. 1) that the food item should be pasteurized or sanitized. In these cases, the fluid and food item can be maintained at the desired food temperature for the required amount of time based on known pasteurization time and temperature tables. In some cases, the temperature may be adjusted upward for at least a brief amount of time to ensure pasteurization or sterilization is achieved.

At 320 the food item can be added to the fluid before, during, or after the initial heating instructions are sent to the cooking device at 306. For example, the food item can be added to the fluid at 308 or 400. The system can receive an indication from a user via the client computing device 106 that the user has added the food item to the fluid. In some implementations, the system can detect when the food item has been added by monitoring changes in the fluid temperature relative to the power delivered to the heater. For example, if the fluid temperature begins rising slower than previously determined it can be inferred that the food item has been added to the fluid. If a user adds the food item early, before the fluid reaches the heater set point temperature, the system can detect this and adapt accordingly. In some implementations the system uses a predictor-correct algorithm, to look at deviance from the prediction to detect the addition of food and other user events (e.g., adding water).

Figure 4:
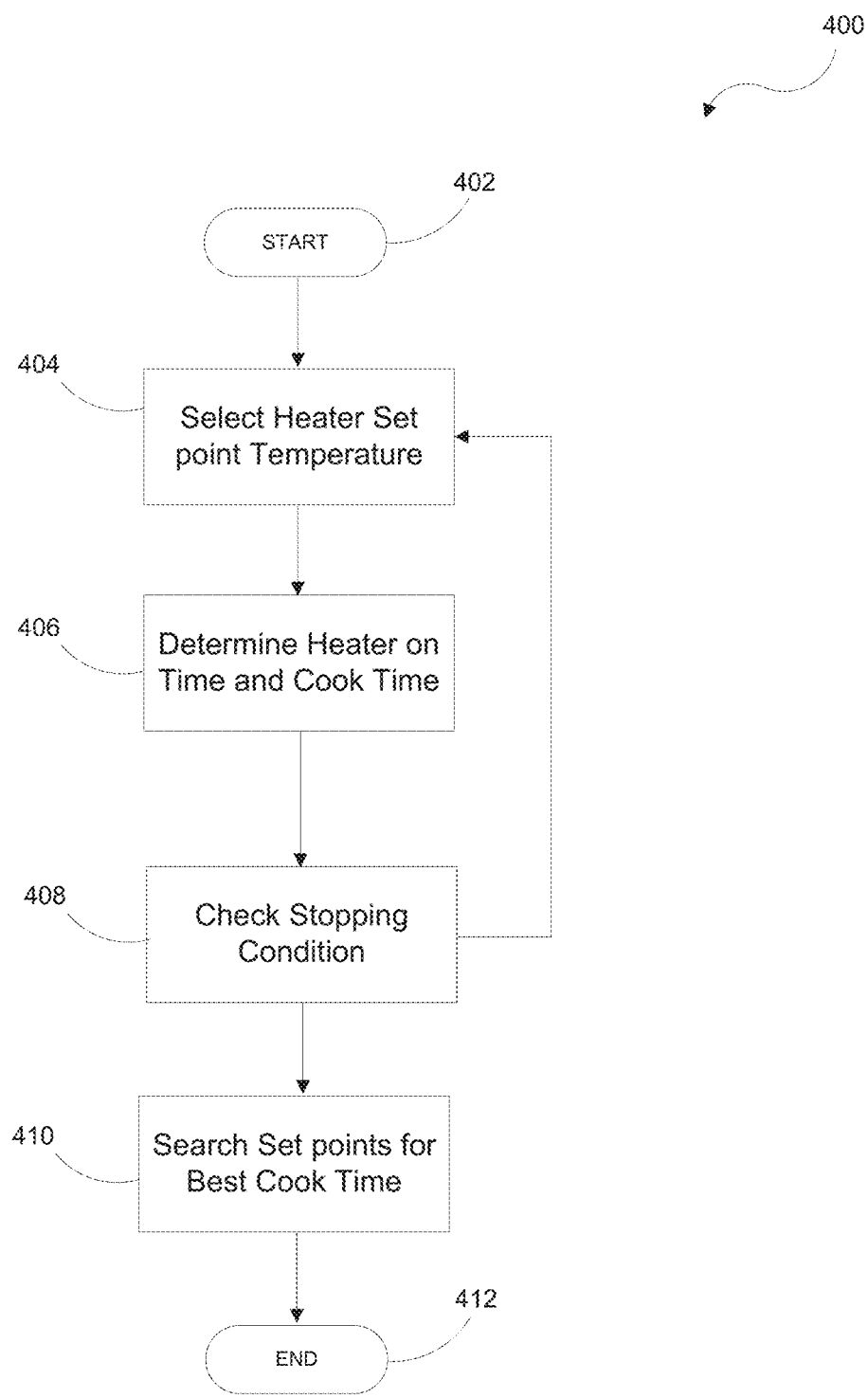
FIG. 4 is a flow diagram showing a method of operation for determining a cooking program according to some implementations of the present technology.

FIG. 4 is a flow diagram showing a representative method 400 for determining an optimal cooking program according to some embodiments of the present technology. The system predicts the outcomes of multiple temperature set points. The system can project each temperature set point forward in time, solving the heat equation (e.g., Equation 2) at multiple time steps, thereby predicting the temperature profile of the food item and the heat energy added to the food item. A Kalman filter can be used to estimate the different heat flows to compute the fluid temperature at the next time step. In some implementations, a shooting method can be used to construct a valid cooking program that heats the core of the food item to the desired temperature while not exceeding the acceptable temperature gradient constraints (e.g., aggressiveness factor). The fluid temperature of a valid cooking program will match the core temperature when the food item is fully heated. The valid cooking programs can then be searched to obtain the cooking program with the shortest cooking time. In some implementations, the user can opt for a less desirable final product (e.g., higher temperature gradient and/or error in core temperature) to reduce the amount of time to cook the food item. The system can provide feedback to the user to alert the user that reduced cooking time may impact the final characteristics of the food item.

At 402, the optimization program starts with measurements from how the fluid has heated during method of operation 300 (FIG. 3) and input from the user, as indicated above, including a desired core temperature, $T_0$, for the food item and an acceptable gradient from surface to core.

At 404, the method selects a heater set point temperature for evaluation. The optimization program searches over all possible temperature set points—the temperature the cooking device tries to heat the fluid to before cooling down to the user's desired core temperature, just as the food's core temperature comes up to that temperature.

At 406, the optimization program computes the heater on time given the selected heater set point temperature. The heater on time is the time at which the cooking device should change its set point from the selected heater set point temperature to the desired core temperature $T_0$. The optimization program steps the system state forward in time: at each step, updating the fluid temperature, fluid volume/mass, and the food's temperature profile (using the new fluid temperature).

In some implementations, the heater on time can be estimated as the time until the food item's surface reaches a maximum value or the time until the food item's core reaches a threshold value. The food item will continue heating (e.g., carryover effect) after the set point has been changed from the temperature set point down to the user's desired-core temperature. This is accounted for as the heating or cooking time, which is usually longer than the heater on time, and is when the food's core is estimated to be $T_0-\delta$ ($\delta$=acceptable variation from desired core temperature). The algorithm seeks to optimize the heating time. In some implementations, the heating time can be estimated using a shooting method.

At 408, the algorithm might stop for several reasons. For example, the temperature set point used in the last step is within s of the temperature set point that gives the best heating time. This s might depend on the current state of the system or the estimate; for example, if the optimization is run every N seconds (e.g., 10-30 seconds) and the fluid will not reach $T_0$ within N seconds, then any temperature set point at or above $T_0$ will produce the same result. Once a stopping condition is reached the optimization program returns to 404 to evaluate another temperature set point.

At 410, once all of the temperature set points have been evaluated, the optimization program searches the acceptable set points for the one with the best cooking time. The best cooking time can be the shortest amount of time or could be a program that finishes at a selected time in the future or a selected time of day. In some implementations, a binomial or bounded Newton's algorithm, a direct search algorithm, or a gradient based search algorithm can be used to search the set points. At 412, once the best temperature set point is selected, the set point temperature and heater on time are returned to method of operation 300 for communication to the cooking device at 312 (FIG. 3).

Figure 5:
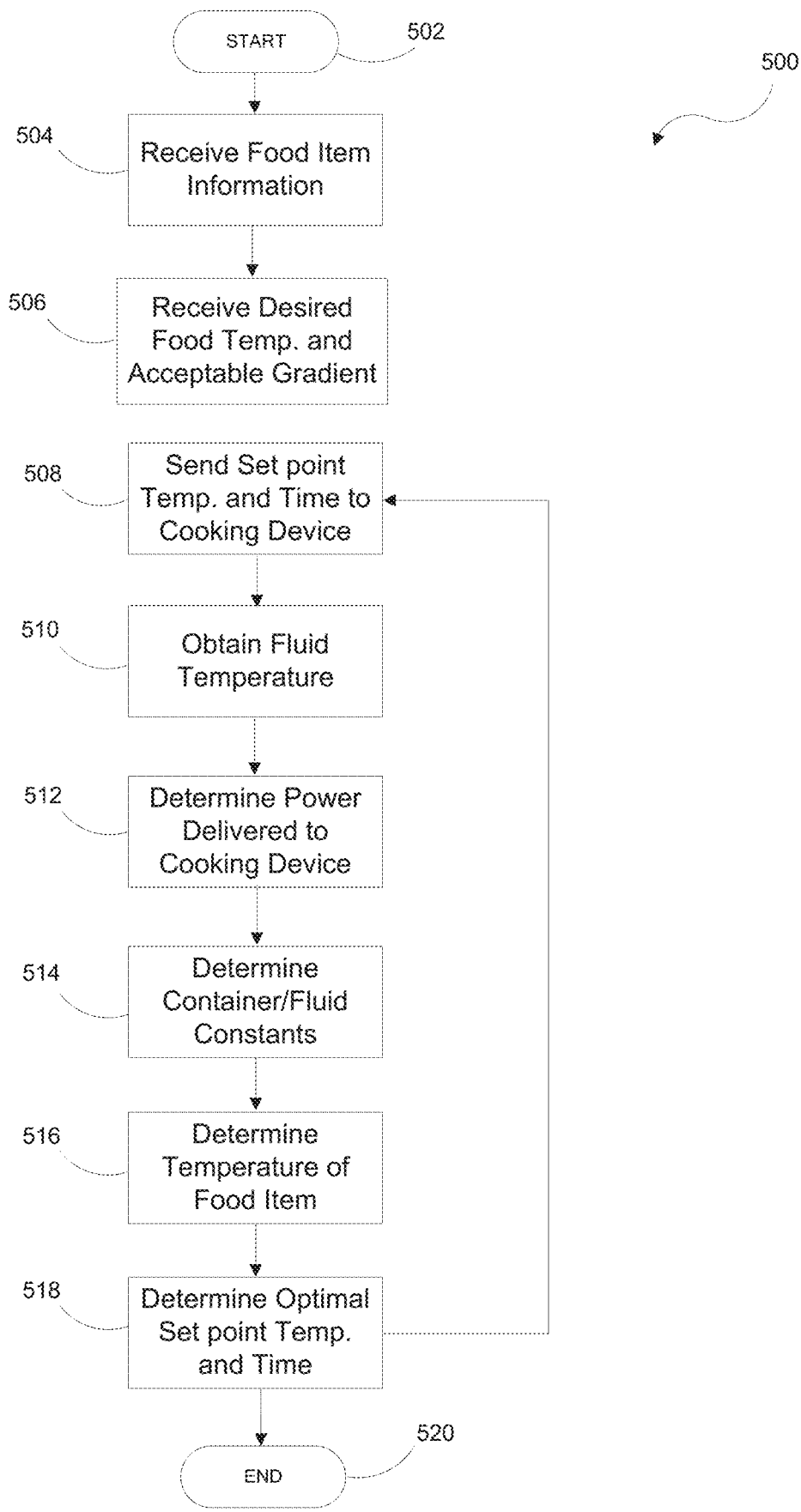
FIG. 5 is a flow diagram showing a representative method of operation of a processor-based predictive cooking system according to some implementations of the present technology.

FIG. 5 is a flow diagram showing a representative method of operation 500 of a processor-based predictive cooking system 100 according to some embodiments of the present technology. This method can be stored in any data storage device, e.g. a processor's on-chip memory, for the cooking device; alternatively, at least some of the method can be performed by the user device. The method can be applied to not only the device 200 but other cooking devices.

The method 500 starts at 502. For example, the method 500 can start in response to activation of a specific application on a client computing device 106 (FIG. 1) or via the control button 204 and/or user interface 205 of the cooking device 200 (FIGS. 2A and 2B). At 504 the system can receive information indicative of one or more characteristics of the food item 12 to be cooked (e.g. in the fluid 10). At 506, the system can receive a desired food temperature and information related to an acceptable temperature gradient across the food item 12. At 508, the system performs a process, including sending instructions for controlling the heater 210 (which could be a heater positioned in a container of the fluid 10). The instructions can include information related to a heater set point temperature and a heater on time. At 510, a temperature measurement (e.g. of the fluid 10) can be obtained from a temperature sensor 211. At 512, a measurement of power delivered to the heater 210 can be determined. At 514, one or more constants related to one or more corresponding physical characteristics (e.g. of at least one of the fluid 10 and the container 104), based on at least one of the temperature measurement and the measurement of power, can be determined. At 516, a food temperature of the food item 12 can be determined. At 518, the heater set point temperature and the heater on time can be determined by solving for, e.g., a fluid temperature that brings the food item 12 to the desired food temperature in the shortest time without exceeding the predetermined acceptable temperature gradient across the food item 12 and that results in the fluid 10 cooling to the desired food temperature at approximately the same time the food item 12 reaches the desired food temperature. The process, (e.g., 508-518) can be repeated one or more times until the food temperature reaches the desired food temperature at which point the method process 500 ends at 520.

FIG. 6A is a graph 600 showing temperatures over time for a fluid bath and a core temperature of a food item during traditional (dashed lines) and predictive (solid lines) cooking processes. In traditional sous vide cooking, the fluid temperature 602 is ramped up to the set point (e.g., 53° C.) and held at that temperature at least until the food item 606 reaches within e.g., 2° C. (line 610) of that set point temperature, which is also the desired food temperature. In the illustrated example, this occurs in approximately 96 minutes (line 614).

In contrast, using the disclosed predictive cooking technology, the fluid temperature 604 can be ramped up to well above the traditional set point temperature. In the illustrated example, the fluid temperature 604 can be raised to approximately 70° C. The fluid is held at that temperature until approximately 30 minutes has elapsed, at which point the heater is turned off and the fluid is allowed to cool. The heater remains off and the fluid cools until the fluid temperature falls to the desired food temperature. Using the disclosed predictive cooking techniques, the fluid reaches the desired food temperature at approximately the same time that the food item 608 reaches the desired food temperature. In the illustrated example, this occurs in approximately 50 minutes (line 612), which is approximately half the time of the traditional technique. At this point, the heater can be turned back on in order to maintain the fluid and food item at the desired food temperature until the user is ready to serve the food and/or to pasteurize the food item.

FIG. 6B is a graph 650 showing the power input over time to the heater in the traditional and predictive techniques. The power is shown in terms of pulse width modulation (PWM)

as percent duty cycle. In traditional sous vide cooking, the heater 652 is ramped up at approximately 100% duty cycle until the set point is achieved. At that point the duty cycle is reduce to approximately 25% to maintain the set point temperature. Using the disclosed predictive techniques, the heater 654 can be ramped up at approximately 100% duty cycle until the fluid reaches the higher set point temperature (e.g., 70° C.). At that point the duty cycle is reduced to approximately 45% to maintain the set point temperature. The heater is then turned off (i.e., 0% duty cycle) to allow the fluid to cool to the desired fluid temperature, at which point the heater is turned on at approximately 25% duty cycle to maintain the fluid and food item at the desired food temperature.

Figure 7:
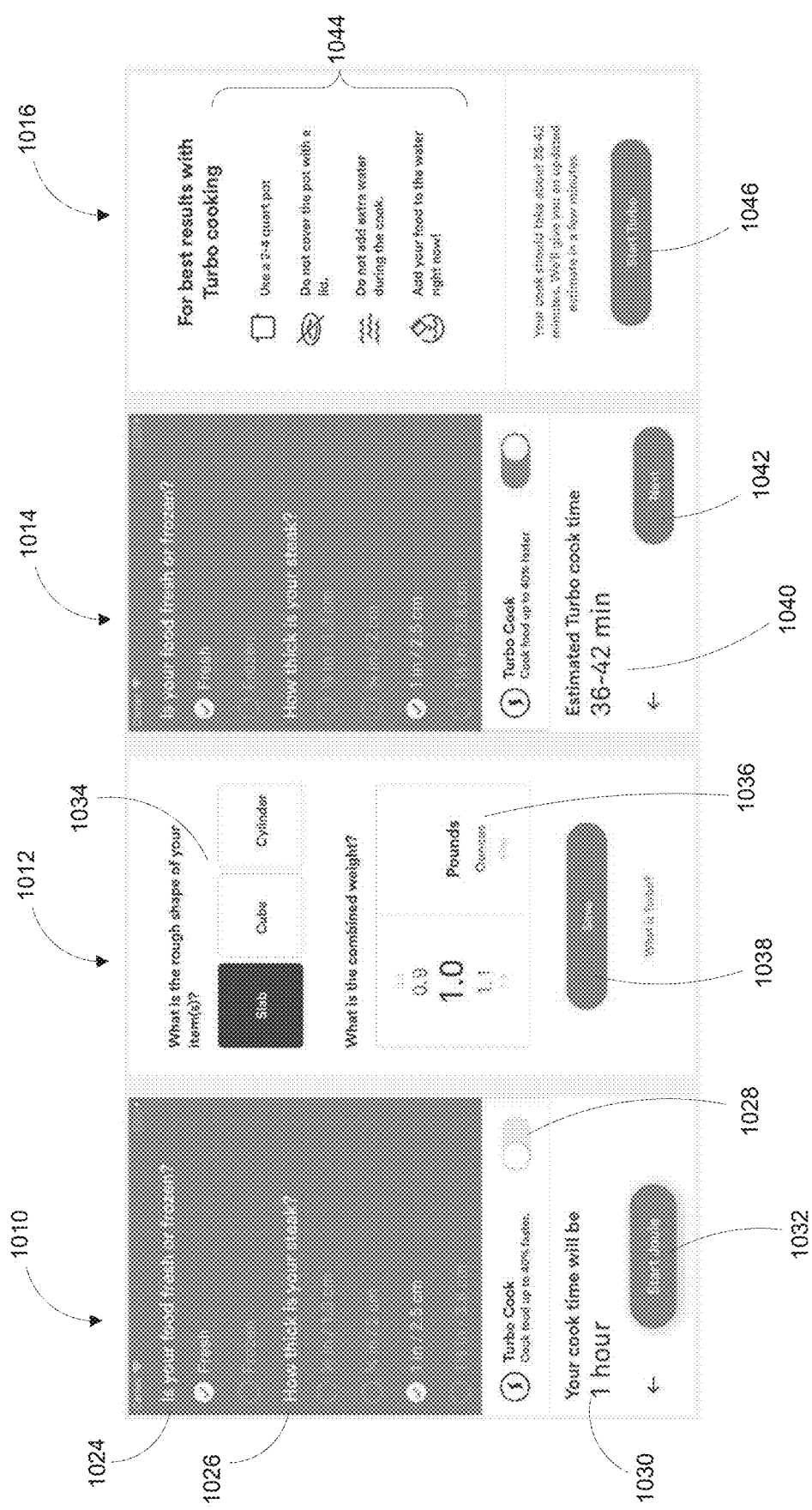
FIG. 7 is an illustration of a representative application user input interface.

FIG. 7 illustrates a representative user interface for receiving various user input regarding the food item to be cooked. For example, in screen 1010 the user can select whether the food item is fresh or frozen with radio buttons 1024 or other suitable graphical control element. In the case where the food item is a steak, the user can input the thickness of the steak with radio buttons 1026. Using this initial input the system can provide a cook time estimate 1030 corresponding to a conventional sous vide cooking process. The user can start this process by selecting the start button 1032. However, screen 1010 also offers the user the option to use the disclosed predictive cooking techniques (e.g., Turbo Cook) by selecting toggle 1028. In this case, the user can input additional information on screen 1012. For example, the user can input the rough shape of the food item by selecting the corresponding button 1034. The user can also input the weight of the food item(s) with spinner 1036. These settings can be saved with the save button 1038, at which point screen 1014 can provide an updated estimated cook time 1040 using the disclosed predictive cooking techniques. Screen 1014 can include a next button 1042 to advance to the next screen. In some implementations, a screen 1016 can provide information and instructions 1044 prior to starting the cooking process with start button 1046.

Figure 8:
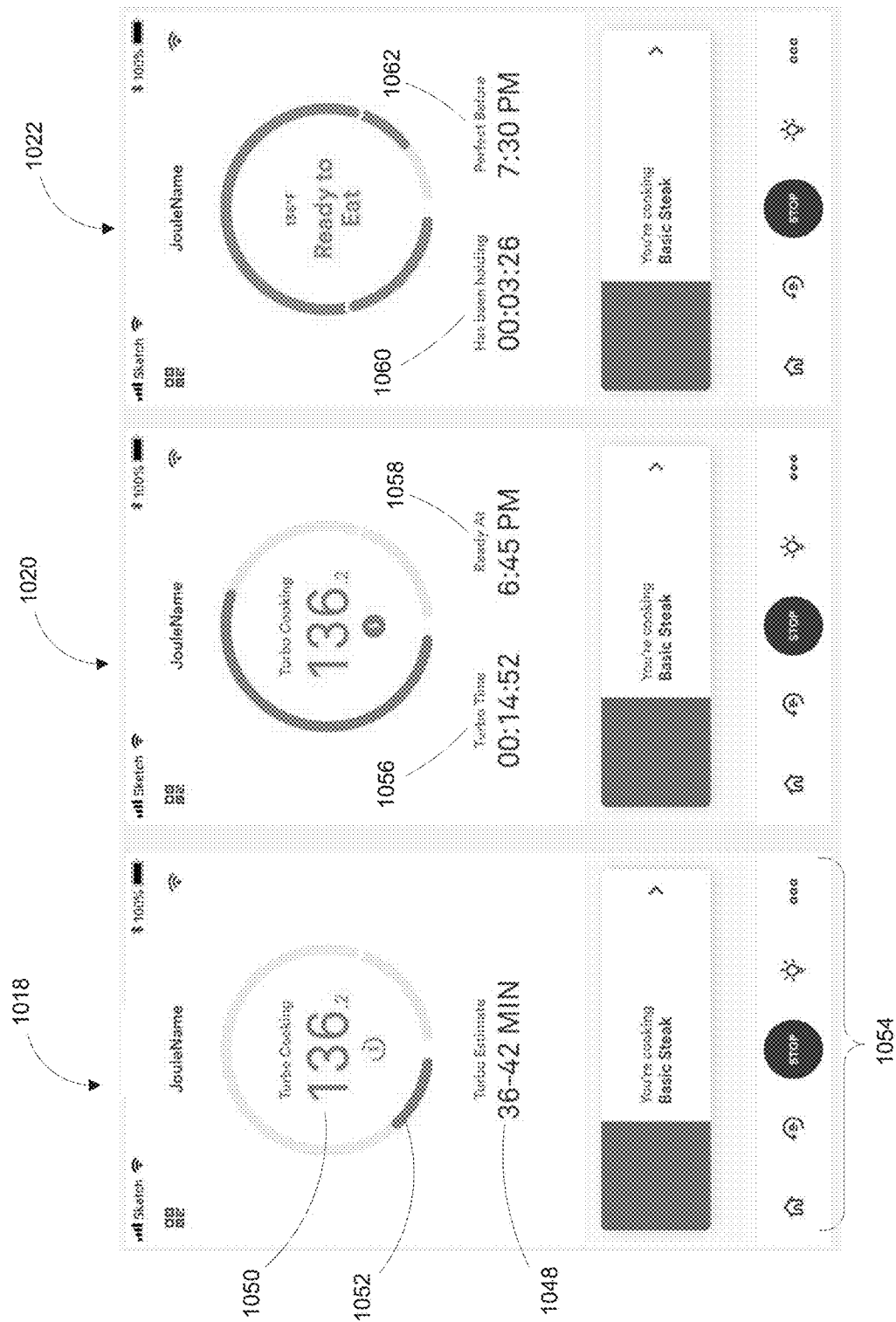
FIG. 8 is an illustration of a representative application status interface.

FIG. 8 illustrates representative status screens which indicate the current temperature and remaining cook time, for example. In an initial status screen 1018, the temperature 1050 is provided along with a progress indicator (e.g., circle) 1052. The estimated cook time 1048 is also provided. In some implementations, the various screens can include navigation controls 1054. In screen 1020, the time remaining 1056 is provided as well as a time of day 1058 at which the food item will be ready. Once the food item is ready, the system can maintain the item at the appropriate temperature until the user is ready to eat. Screen 1022 provides the length of time 1060 that the food item has been holding at the finished temperature and also provides a best before time 1062.

In some implementations, a representative cooking system can comprise a cooking device at least partially submergible in a container of fluid, the device including a heater and a temperature sensor, and at least one memory device storing instructions. The instructions can cause at least one processor to: receive information indicative of one or more characteristics of a food item to be cooked in the fluid; receive a desired food temperature; perform a control process; and to repeat the control process one or more times until the food temperature reaches the desired food temperature. The control process can include: sending instructions for controlling the heater, including information related to a heater set point temperature and a heater on time; obtaining a temperature measurement of the fluid from the temperature sensor; determining a measurement of power delivered to the heater; determining one or more constants related to one or more corresponding physical characteristics of at least one of the fluid and the container based on at least one of the temperature measurement and the measurement of power; determining a food temperature of the food item; and determining the heater set point temperature and the heater on time.

In some implementations, the heater set point temperature and the heater on time can be determined by solving for a fluid temperature that brings the food item to the desired food temperature in the shortest time without exceeding a predetermined acceptable temperature gradient across the food item and that results in the fluid cooling to the desired food temperature at approximately the same time the food item reaches the desired food temperature. The system can also wirelessly receive information related to the acceptable temperature gradient across the food item via a user device, such as a mobile phone or tablet. The system can provide feedback to the user device related to the predetermined acceptable temperature gradient. The heater set point temperature and the heater on time can be determined by solving for a fluid temperature that brings the food item to the desired food temperature at a user specified time without exceeding a predetermined acceptable temperature gradient across the food item. The system can estimate at least one of a container type and a container size based on the one or more constants wherein the one or more constants can include at least one of a fluid volume value ($c_1$), a container thermal conductivity value ($c_2$), or an evaporative loss value ($c_4$). In some implementations, the system can receive at least one of a container type and a container size. The at least one of a container type and a container size can be received based on a name, number, or bar code positioned on the container. In some implementations, the system can detect when the food item is placed in the container based on a change in the temperature measurement and a change in the measurement of power. The system can identify if the food item is placed in the container before the fluid reaches the heater set point temperature and can adjust the heater set point temperature in response. The system can maintain the desired food temperature for a pasteurization time period selected based on the desired food temperature and the information indicative of one or more characteristics of the food item. The cooking device can include a pressure sensor and/or the system can receive geographic location information from the user device and estimate atmospheric pressure based on an altitude of the geographic location.

In some implementations, a representative cooking system can comprise a cooking device, the device including a heater and a temperature or pressure sensor, and at least one memory device storing instructions. The instruction can cause at least one processor to: receive information indicative of one or more characteristics of a food item to be cooked; receive a desired food temperature; and perform a process. The process can include sending instructions for controlling the heater, including a heater set point temperature, a heater on time, or both a heater set point temperature and a heater on time; obtaining a temperature measurement (T) related to cooking the food item from the sensor; determining a measurement of power (P) delivered to the heater; determining a fluid volume value ($c_1$), a container thermal conductivity value ($c_2$), or an evaporative loss value ($c_4$), by fitting a predetermined physical model to at least the temperature measurement (T) and the measurement of power (P); determining a food temperature ($\tau$) of the food item; and determining the heater set point temperature, the heater on time, or both the heater set point temperature and the heater on time.

The system can include instructions for causing the processor to repeat the control process one or more times until the food temperature reaches the desired food temperature. In some implementations, the cooking device is at least partially submergible in a container of fluid. The heater set point temperature and the heater on time can be determined by solving for a fluid temperature that brings the food item to the desired food temperature in the shortest time without exceeding a predetermined acceptable temperature gradient across the food item and that results in the fluid cooling to the desired food temperature at approximately the same time the food item reaches the desired food temperature. The cooking device can be at least partially submergible in a container of fluid, and the physical model can comprise Equation 1, where (F) is energy going into the food, ($c_3$) is an offset dependent on air temperature and dew point, and (H) is the specific humidity at the fluid surface. The physical model can be solved using one of a least squares method or a Kalman filter method. The food temperature ($\tau$) can be determined with Equations 2-4, where $\tau(0 \le r \le R, t \ge t_0)$ is the food temperature, $t_0$ is when the food is added, $\alpha = k/(\rho cp)$ is thermal diffusivity, k is thermal conductivity, $\rho$ is density, cp is specific heat, 2R is the characteristic thickness, $0 \le \beta \le 2$ is the characteristic shape, h is surface heat transfer coefficient, and $\tau_0$ is the initial food temperature. In some implementations, the heater set point temperature can be greater than the desired food temperature and the cooking device can be at least partially submergible in a container of fluid.

In some implementations, a representative method of heating a food item can comprise receiving information indicative of one or more characteristics of the food item to be cooked; receiving a desired food temperature; receiving information related to an acceptable temperature gradient across the food item; performing a process; and repeating the process one or more times until the food temperature reaches the desired food temperature. The process can include: sending instructions for controlling a heater positioned near the food item to be cooked, including information related to a heater set point temperature and a heater on time; obtaining a temperature measurement relative to an environment proximate to the food item to be cooked; determining a measurement of power delivered to the heater; determining one or more constants related to one or more corresponding physical characteristics related to an environment surrounding a food item based on at least one of the temperature measurement and the measurement of power; determining an estimate of food temperature of the food item; and determining the heater set point temperature and the heater on time by solving for a fluid temperature that brings the food item to the desired food temperature in the shortest time without exceeding the predetermined acceptable temperature gradient across the food item and that results in the fluid cooling to the desired food temperature at approximately the same time the food item reaches the desired food temperature.

In some implementations, the method is for heating a food item in a container of fluid and the determining the one or more constants can include determining at least one of a fluid volume value ($c_1$), a container thermal conductivity value ($c_2$), and an evaporative loss value ($c_4$) by fitting a physical model to at least the temperature measurement (T) and the measurement of power (P). The physical model can comprise Equation 1, where (F) is energy going into the food, ($c_3$) is an offset dependent on air temperature and dew point, and (H) is the specific humidity at the fluid surface.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

In FIG. 1, network 112 can be a local area network (LAN) or a wide area network (WAN), but can also be other wired or wireless networks. Network 112 may be the Internet or some other public or private network. Client computing devices 106 can be connected to network 112 through a network interface, such as by wired or wireless communication. The techniques disclosed herein can be implemented on one or more processors. For example, the system can be implemented on one or more networked processors 108, the cooking device processor 213, a processor of an associated client computing device 106, or any suitable combination thereof.

Figure 9:
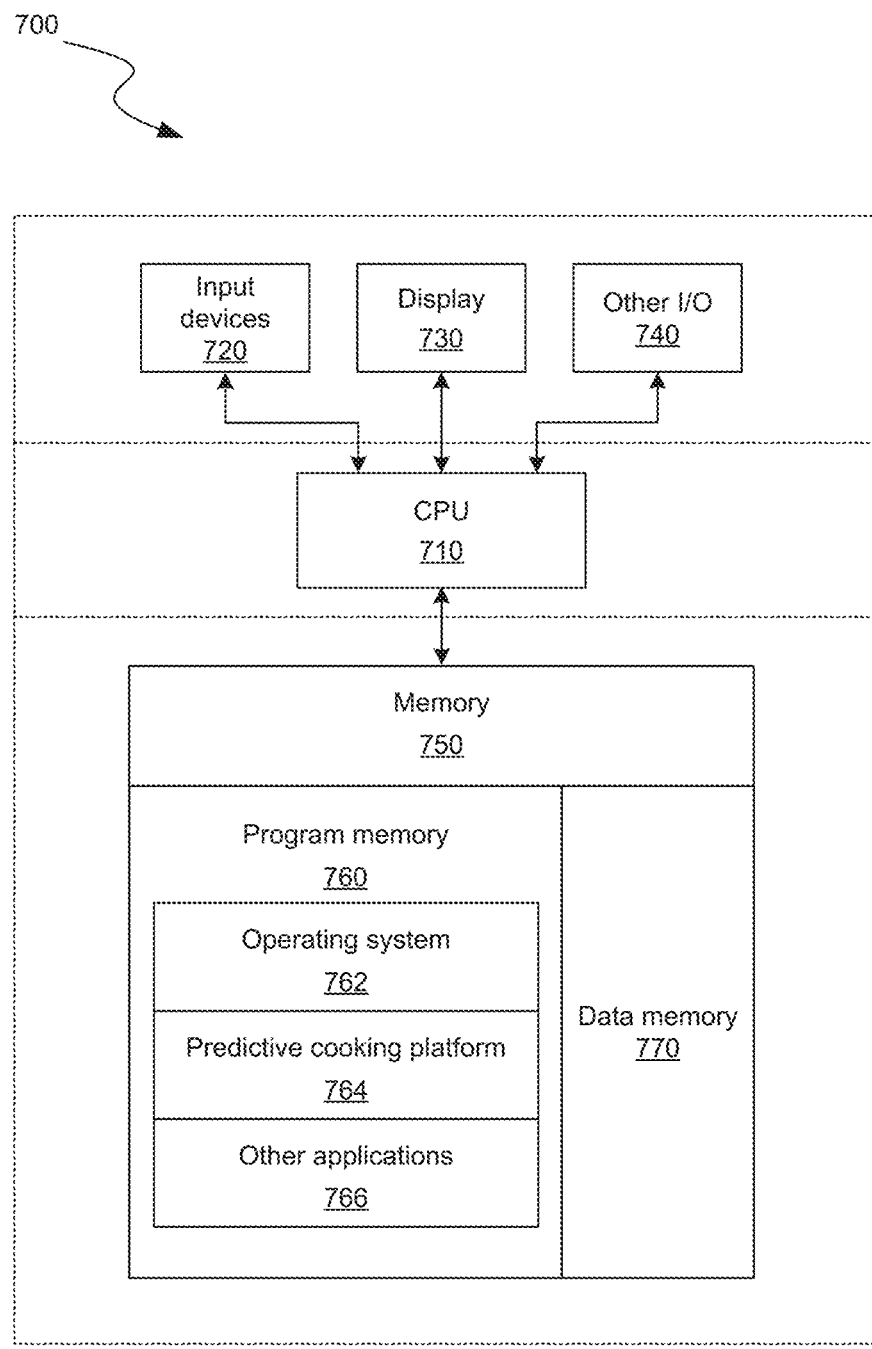
FIG. 9 is a block diagram illustrating an overview of devices on which some implementations can operate.

Several implementations are discussed below in more detail in reference to the figures. Turning now to the figures, FIG. 9 is a block diagram illustrating an overview of devices on which some implementations of the disclosed technology can operate. The devices can comprise hardware components of a device 700 that determines optimal cooking programs. Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, predictive cooking platform 764, and other application programs 766. Memory 750 can also include data memory 770 that can include start time, completion time, user preferences such as tenderness of meat, etc., which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 10:
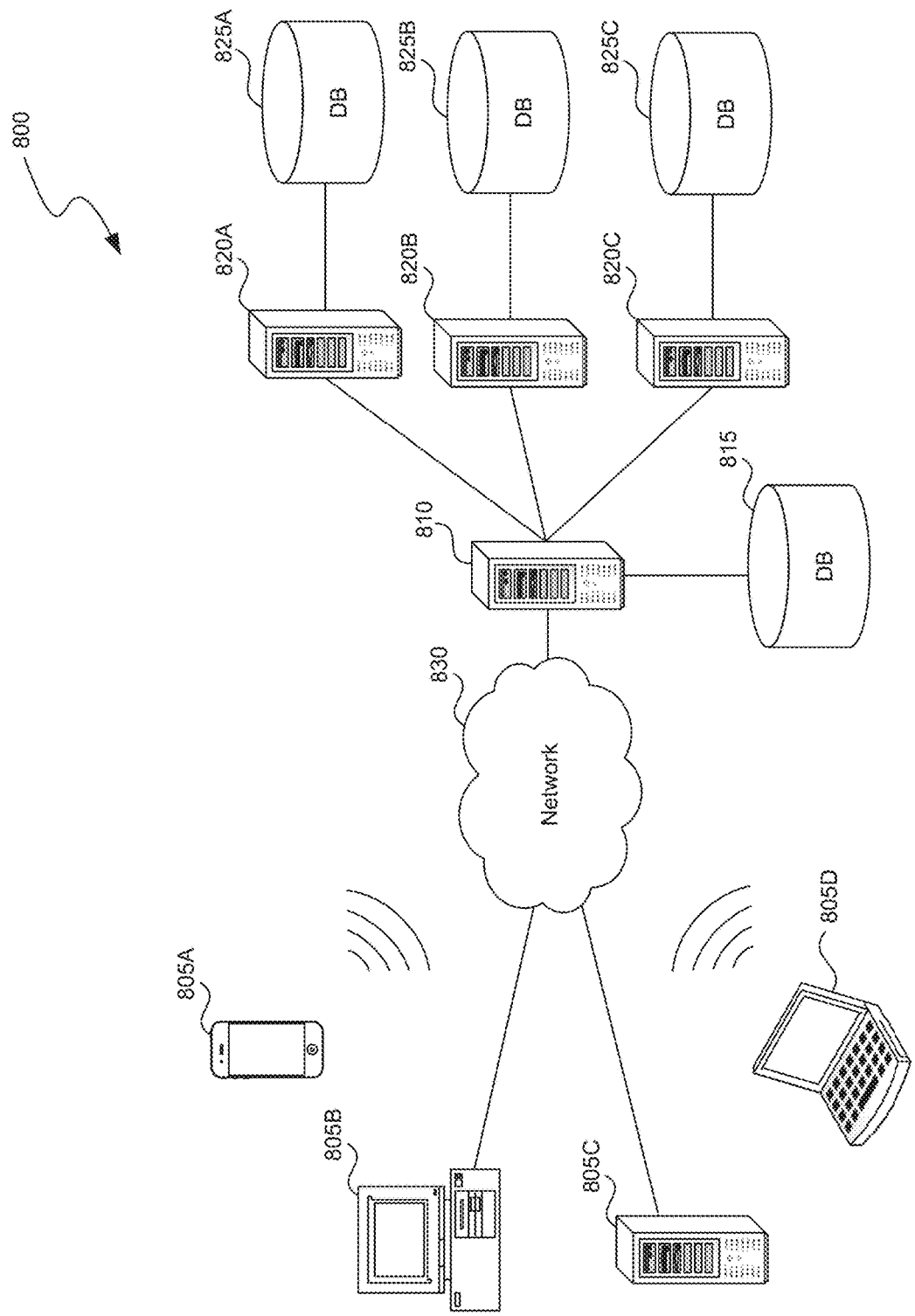
FIG. 10 is a block diagram illustrating an overview of an environment in which some implementations can operate.

FIG. 10 is a block diagram illustrating an overview of an environment 800 in which some implementations of the disclosed technology can operate. Environment 800 can include one or more client computing devices 805A-D, examples of which can include device 700. Client computing devices 805 can operate in a networked environment using logical connections through network 830 to one or more remote computers, such as a server computing device 810.

In some implementations, server computing device 810 can be an edge server that receives client requests and coordinates fulfillment of those requests through other servers, such as servers 820A-C. Server computing devices 810 and 820 can comprise computing systems, such as device 700. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information such as start time, completion time, and user preferences. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Figure 11:
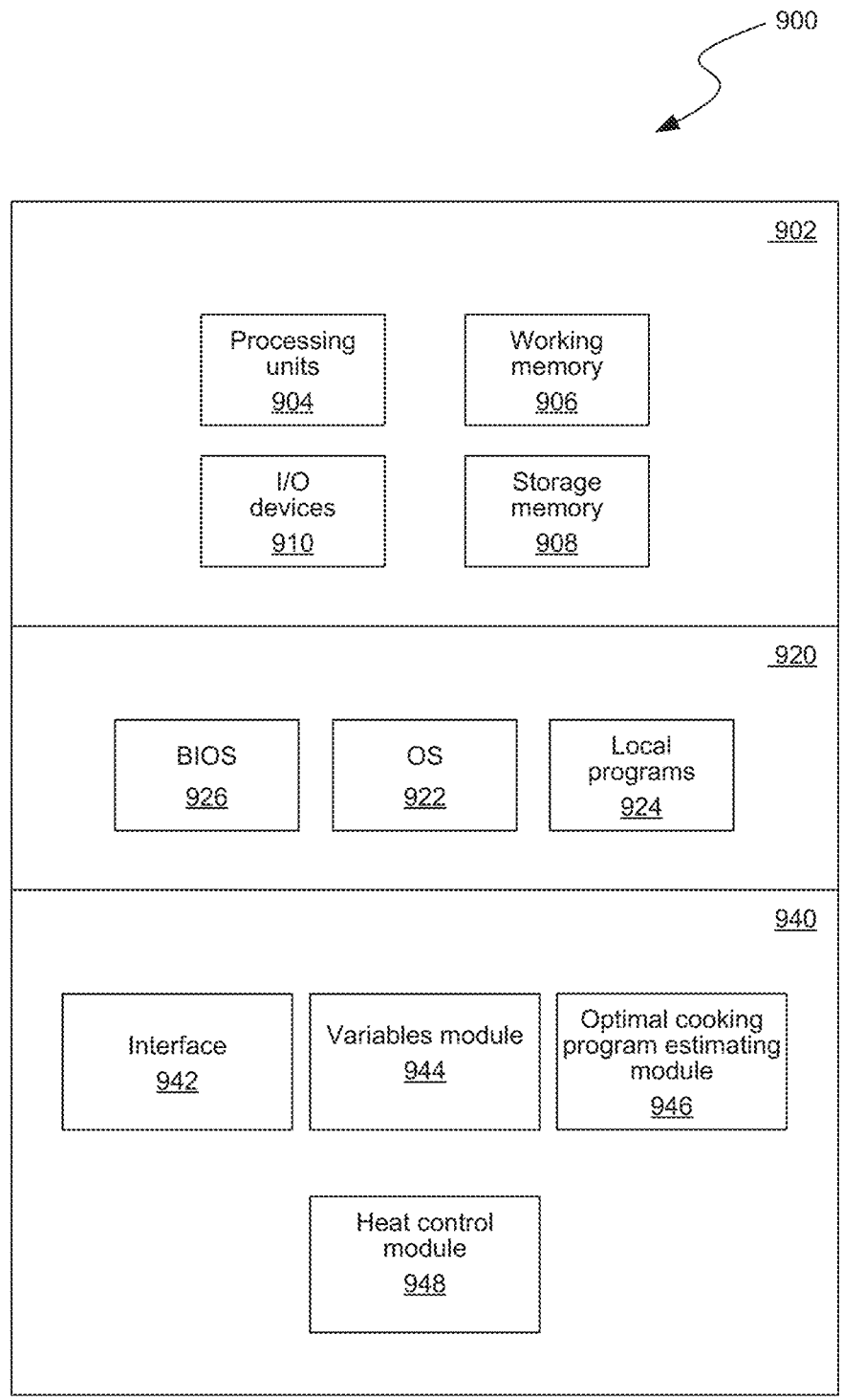
FIG. 11 is a block diagram illustrating components which, in some implementations, can be used in a system employing the disclosed technology.

FIG. 11 is a block diagram illustrating components 900 which, in some implementations, can be used in a system employing the disclosed technology. The components 900 include hardware 902, general software 920, and specialized components 940. As discussed above, a system implementing the disclosed technology can use various hardware, including processing units 904 (e.g., CPUs, GPUs, APUs, etc.), working memory 906, storage memory 908, and input and output devices 910. Components 900 can be implemented in a client computing device such as client computing devices 805 or on a server computing device, such as server computing device 810 or 820.

General software 920 can include various applications, including an operating system 922, local programs 924, and a basic input output system (BIOS) 926. Specialized components 940 can be subcomponents of a general software application 920, such as local programs 924. Specialized components 940 can include variables module 944, optimal cooking program estimating module 946, heat control module 948, and components that can be used for transferring data and controlling the specialized components, such as interface 942. In some implementations, components 900 can be in a computing system that is distributed across multiple computing devices or can be an interface to a server-based application executing one or more of specialized components 940.

Those skilled in the art will appreciate that the components illustrated in FIGS. 9-11 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A cooking system, comprising:
   a cooking device at least partially submergible in a container of fluid, the cooking device including a heater and a temperature sensor;
   a computing device including at least one processor and at least one memory device coupled to the at least one processor, wherein the at least one memory device stores instructions, wherein the at least one processor is configured, by execution of the instructions, to:
   receive information indicative of one or more characteristics of a food item to be cooked in the fluid;
   receive a desired food temperature; perform a control process, wherein the at least one processor is configured to:
   send instructions for controlling the heater, including information related to a heater set point temperature and a heater power on time;
   obtain a temperature measurement of the fluid from the temperature sensor;
   determine power delivered to the heater;
   determine one or more physical characteristic values including one or more corresponding physical characteristics of at least one of the fluid and the container by solving a physical model based on changes in the temperature measurement of the fluid and the power delivered to the fluid via the heater;
   predict a food temperature profile of the food item for multiple temperature set points using the one or more physical characteristics values and by projecting each temperature set point of the multiple temperature set points forward in time by solving the physical model;
   generate, using the food temperature profile of the food item as predicted for the multiple temperature set points, a plurality of cooking programs that heat a core of the food item to the desired food temperature while not exceeding an acceptable temperature gradient constraint, wherein each cooking program has an associated cooking time to reach the desired food temperature;
   search the plurality of cooking programs to determine a particular cooking program which has the shortest cooking time; and
   update the heater set point temperature and the heater power on time, using the particular cooking program; and
   repeat the control process one or more times using the heater set point temperature as updated and the heater power on time as updated until the food temperature equals the desired food temperature.

2. The cooking system of claim 1, wherein the heater set point temperature as updated and the heater on time as updated are determined, based on a prediction of the temperature of the fluid projected over time for one of the set point temperatures of the multiple set point temperatures projected over time so that the cooking system brings the food item to the desired food temperature in the period of time to cook the food item or to complete cooking of the food item without exceeding the acceptable temperature gradient constraint across the food item and that results in the fluid cooling to the desired food temperature at the same time the food item reaches the desired food temperature.

3. The cooking system of claim 2, further comprising wirelessly receiving information including the acceptable temperature gradient constraint across the food item via a user device, and wherein the user device is a mobile phone or tablet.

4. The cooking system of claim 3, further comprising providing feedback to the user device including the acceptable temperature gradient constraint.

5. The cooking system of claim 1, further comprising estimating at least one of a container type and a container size based on the one or more physical characteristic values, wherein the one or more physical characteristic values include at least one of a fluid volume value ($c_1$), a container thermal conductivity value ($c_2$), or an evaporative loss value ($c_4$).

6. The cooking system of claim 1, further comprising receiving at least one of a container type and a container size.

7. The cooking system of claim 6, wherein the at least one of a container type and a container size is received based on a name, number, or bar code positioned on the container.

8. The cooking system of claim 1, further comprising detecting when the food item is placed in the container based on a change in the temperature measurement and a change in the power delivered to the heater.

9. The cooking system of claim 8, further comprising identifying if the food item is placed in the container before the fluid reaches the heater set point temperature and adjusting the heater set point temperature in response.

10. The cooking system of claim 1, further comprising maintaining the desired food temperature for a pasteurization time period selected based on the desired food temperature and the information indicative of one or more characteristics of the food item.

11. The cooking system of claim 1, wherein the cooking device includes a pressure sensor.

12. The cooking system of claim 1, further comprising receiving geographic location information from a user device and estimating atmospheric pressure based on an altitude of the geographic location.

13. The cooking system according to claim 1, wherein the processor is further configured to turn off the heater to allow the fluid to cool until the fluid temperature falls to the desired food temperature.

14. A cooking system, comprising:
    a cooking device, the cooking device including a heater and a temperature or pressure sensor; and a computing device including at least one processor and at least one memory device coupled to the at least one processor, wherein the at least one memory device stores instructions, wherein the at least one processor is configured, by execution of the instructions, to:

receive information indicative of one or more characteristics of a food item to be cooked;

receive a desired food temperature;

perform a control process, wherein the at least one processor is configured to:

send instructions for controlling the heater, including a heater set point temperature, a heater on time, or both a heater set point temperature and a heater on time;

obtain, from the sensor, a temperature measurement (T) indicative of cooking of the food item;

determine power (P) delivered to the heater;

determine at least a fluid volume value ($c_i$), a container thermal conductivity value ($c_2$), or an evaporative loss value ($c_4$), by fitting a predetermined physical model to at least the temperature measurement (T) and the power (P) delivered to the heater;

predict a food temperature profile of the food item for multiple temperature set points using the fluid volume value ($c_i$), the container thermal conductivity value ($c_2$) or an evaporative loss value ($c_4$), and by projecting each temperature set point of the multiple temperature set points forward in time by solving a physical model;

generate, using the food temperature profile of the food item as predicted for the multiple temperature set points, a plurality of cooking programs that heat a core of the food item to the desired food temperature while not exceeding an acceptable temperature gradient constraint, wherein each cooking program has an associated cooking time to reach the desired food temperature;

search the plurality of cooking programs to determine a particular cooking program which has the shortest cooking time; and update the heater set point temperature and the heater power on time, using the particular cooking program; and repeat the control process one or more times using the heater set point temperature as updated and the heater power on time as updated until the food temperature equals the desired food temperature.

15. The cooking system of claim 14, wherein the cooking device is at least partially submergible in a container of fluid, wherein the heater set point temperature as updated and the heater on time as updated are determined based on a prediction of the temperature of the fluid projected over time for one of the set point temperatures of the multiple set point temperatures projected over time so that the cooking system brings the food item to the desired food temperature in the period of time to cook the food item or to complete cooking of the food item without exceeding the acceptable temperature gradient constraint across the food item and that results in the fluid cooling to the desired food temperature at the same time the food item reaches the desired food temperature.

16. The cooking system of claim 14, wherein the cooking device is at least partially submergible in a container of fluid, and wherein the physical model is stored in the at least one memory device and used by the at least one processor for determining at least the fluid volume value ($c_1$), the container thermal conductivity value ($c_2$), or the evaporative loss value ($c_4$), wherein the physical model is:

$$\frac{dT}{dt} = c_1(P - F) - c_2 T + c_3 - c_4 H(T),$$

where (F) is energy going into the food, ($c_3$) is an offset dependent on air temperature and dew point, and (H) is the specific humidity at the fluid surface.

17. The cooking system of claim 16, wherein the physical model is solved using one of a least squares method or a Kalman filter method.

18. The cooking system of claim 14, wherein the food temperature ($\tau$) is determined by the at least one processor using an equation stored in the at least one memory device, wherein the equation is defined as:

$$\frac{\partial \tau}{\partial t} = \alpha\left(\frac{\partial^2 \tau}{\partial r^2} + \frac{\beta}{r}\frac{\partial \tau}{\partial r}\right),$$

$$\tau(r, t_0) = \tau_0,$$

$$\frac{\partial \tau}{\partial r}(0, t) = 0, \quad \frac{\partial \tau}{\partial r}(R, t) = \frac{h}{k}[T(t) - \tau(R, t)],$$

where $\tau(0 \leq r \leq R, t \geq t_0)$ is the food temperature, $t_0$ is when the food is added, $\alpha = k/(\rho cp)$ is thermal diffusivity, k is thermal conductivity, $\rho$ is density, cp is specific heat, 2R is the characteristic thickness, $0 \leq \beta \leq 2$ is the characteristic shape, h is surface heat transfer coefficient, and $\tau_0$ is the initial food temperature.

19. The cooking system of claim 14, wherein the heater set point temperature is greater than the desired food temperature, and wherein the cooking device is at least partially submergible in a container of fluid.

20. The cooking system according to claim 14, wherein the processor is further configured to turn off the heater to allow the fluid to cool until the fluid temperature falls to the desired food temperature.

* * * * *